United States Patent [19]
Akiyama et al.

[11] Patent Number: 4,680,785
[45] Date of Patent: Jul. 14, 1987

[54] PERSONAL-SIGNALING COMMUNICATION SYSTEM

[75] Inventors: Tadahiko Akiyama; Yoshio Otsuka, both of Koriyama, Japan

[73] Assignee: Nippo Communication Industrial Co., Ltd., Fukushima, Japan

[21] Appl. No.: 657,199

[22] Filed: Oct. 3, 1984

[51] Int. Cl.⁴ ..................... H04M 1/276; H04M 1/57; H04Q 7/04
[52] U.S. Cl. ..................... 379/57; 379/142; 379/216; 379/245; 379/357
[58] Field of Search .......... 179/18 BA, 2 EC, 18 BF, 179/18 BE, 90 CS, 90 AN, 5.5, 2 CA, 6.3 CC; 340/825.44, 825.48

[56] References Cited

U.S. PATENT DOCUMENTS

| | | | |
|---|---|---|---|
| 3,668,317 | 6/1972 | Vitalo | 379/84 |
| 3,784,793 | 1/1974 | Ito et al. | 379/357 |
| 4,178,476 | 12/1979 | Frost | 379/59 |
| 4,266,098 | 5/1981 | Novak | 379/77 |
| 4,266,102 | 5/1981 | Stanley et al. | 379/157 |
| 4,304,968 | 12/1981 | Klausner et al. | 379/69 |
| 4,313,035 | 1/1982 | Jordan et al. | 379/207 |
| 4,403,212 | 9/1983 | Masaki | 340/311.1 |
| 4,477,807 | 10/1984 | Nakajima et al. | 340/825.44 |
| 4,490,579 | 12/1984 | Godoshian | 340/825.44 |

FOREIGN PATENT DOCUMENTS 0013571 1/1980 Japan .................................. 379/211

Primary Examiner—Thomas W. Brown
Attorney, Agent, or Firm—Antonelli, Terry & Wands

[57] ABSTRACT

A personal-call communication system wherein a personal identification number is assigned to each telephone user, and an arbitrary person is called by wireless by dialing a corresponding personal calling number. The called person sets an ID-card-type portable device memorizing one's own personal identification information in a card reader of a telephone set, and communicates with the calling party over the wire system via an exchange. The system allows a direct call of an individual person, who in turn has a choice as to whether or not a response should be taken depending on the calling party whose name is indicated to the called party.

4 Claims, 7 Drawing Figures

PERSONAL-SIGNALING COMMUNICATION SYSTEM

The present invention relates to an improved communication system and, particularly, to a personal-signaling telephone system operable for calling individual persons by dialing a number code assigned to each person.

In a conventional communication system, e.g., telephone system, each telephone set as a terminal unit has a call number, and a call is made by dialing the number of the telephone set which belongs to the person to be called in expectation that the person would stay near the telephone set. However, the person does not always keep one's seat in the office or the like, and frequently the aim of the calling party is not fulfilled.

Conventionally, there has been a call forwarding service, but this service needs a complicated operation, does not provide a chance to specify a person to be called until someone answers, and does not attain the caller's aim when the called person is moving from one place to another. Other conventional systems for this purpose are the paging service, including the loudspeaker paging service where a person is called by a loudspeaker and the code calling service where a display panel chimes to show the code of a called person, and the pocket bell service in which a person is called by a pocket bell pager and the called person makes contact to a predetermined person through a nearby telephone set. However, it is awkward and time consuming to make a paging call or pocket bell call after making a telephone call only to find that the called person is absent, and therefore these services are not entirely satisfactory. In the international telephone service system, there is the person-to-person call service where the called party can be specified by name, but this system needs the operator's intervention.

It is a prime object of the present invention to provide a novel communication system capable of signaling individual persons located anywhere within a certain service area by dialing the number code assigned to each individual person instead of each terminal unit such as a telephone set.

Another object of the invention is to provide a communication system in which the name of a calling person is displayed on the display panel on the portable device for allowing the selection as to whether the call should be accepted or rejected depending on the caller's name.

In order to achieve the above objectives, signaling is conducted by wireless, while communication is made through the wire system via conventional exchanges. For the simplified answering operation, each individual person carries a portable device in which identification information such as an ID number specific to the individual is memorized, so that connection is accomplished by inserting the device in a card reader of a telephone set.

The present invention will be apparent from the following detailed description taken in conjunction with the accompanying drawings, in which.

The following describes an embodiment of this invention applied to a private branch exchange. The telephone set used is provided with a card reader, as shown for example in FIG. 1, and is capable of transacting data with the exchange. Individuals who use this type of telephone set carry a portable device incorporating a call signal receiver having functions similar to those of a pocket bell receiver and an ID card. In this embodiment the receiver and ID card are integrated in one unit of the credit card size as shown in FIG. 2, which further incorporates a caller's name display panel.

Telephone numbers are not given to telephone sets but are given individual persons, i.e., receiver-ID-card combinations as a portable integrated memory receiver device, are given numbers. The telephone number may be the same as the ID number, but for an existing EDP (Electronic Data Processing) management system in each company, the ID number is preferably consistent with the membership number given to each member of the company. The telephone number is desirably made to have as small a number of digits as possible, and in this embodiment it is determined independently of the ID number, with a conversion table for both number systems being provided in the exchange. The telephone set does not need to have a telephone number, except for the case where person-to-station calling is allowed in addition to person-to-person calling, and this call can be answered by any person who is near the telephone set.

Figure 1:
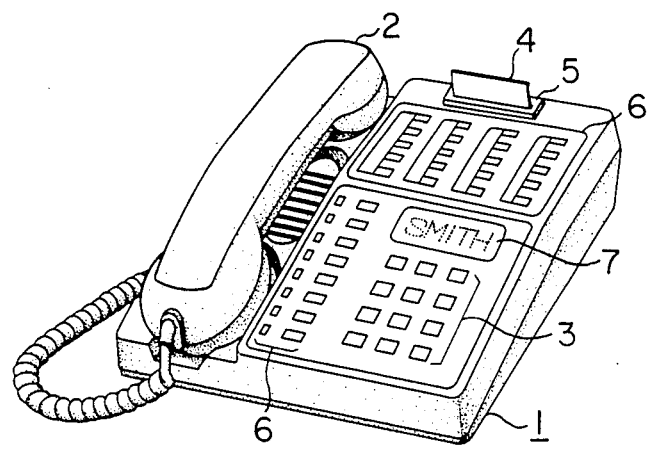
FIG. 1 is an illustration showing an embodiment of the telephone set used in the personal-signaling communication system according to the present invention.

In FIG. 1, a telephone set 1 constituting a communication terminal unit is made up of a handset 2, a push-button dial 3, a portable device 4 consisting of an ID card and receiver, a card reader 5 for reading the portable device 4, a key-lamp set 6, and a display panel 7. The portable device 4 is set in the card reader 5 when the holder of the device is at the telephone set.

Figure 2:
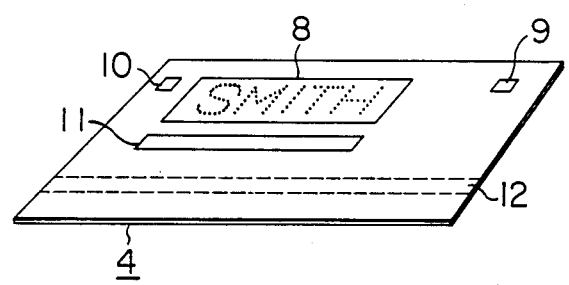
FIG. 2 is an illustration showing an embodiment of the portable device to be set on the telephone set shown in FIG. 1.

The portable device 4 shown in more detail in FIG. 2 is formed in a plastic card, in which there are incorporated a pocket bell receiver constructed by thick or thin film technology and a dot-matrix display panel 8. Further provided on the ID card type portable device 4 are a piezo-electric acoustic element, a dry cell, an antenna, a key 9 for stopping the alert signal, and a key 10 for erasing the display, both keys being of the capacitance type. The device has a surface area 11 for writing the holder's name and an area 12 for magnetic recording of the ID code.

Figure 3:
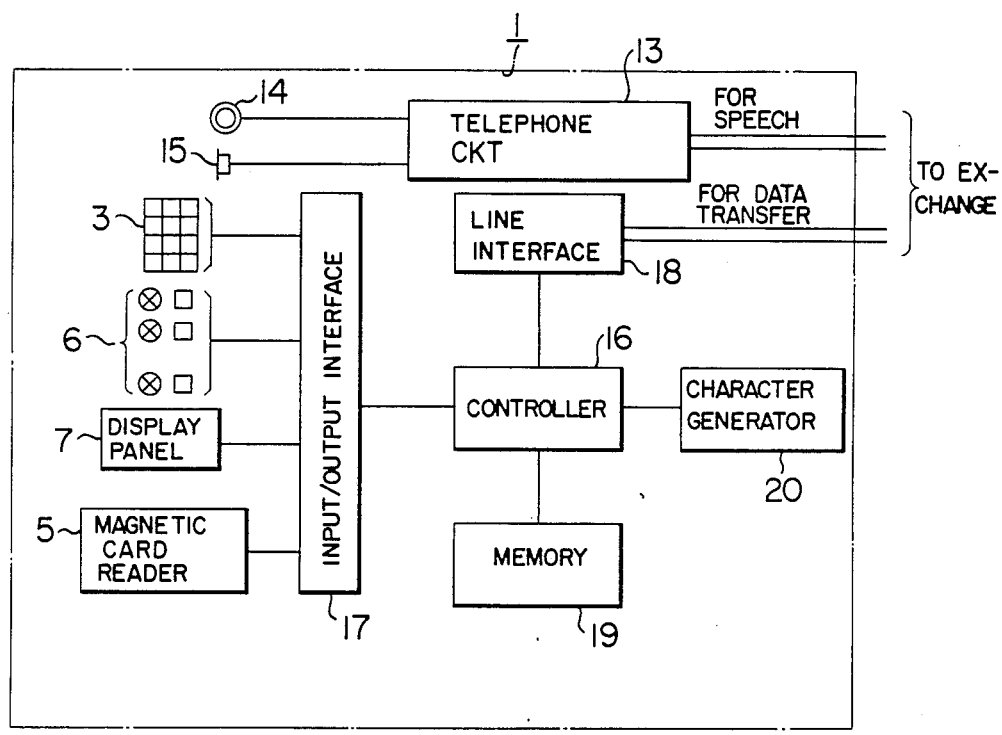
FIG. 3 is a block diagram showing the arrangement of the telephone set shown in FIG. 1.

As shown in FIG. 3, the telephone set 1 is made up of a section including a telephone network 13, a microphone 14 and a receiver 15, and another section including a push-button dial 3, a card reader 5, a lamp-key unit 6, a display panel 7, an input/output interface 17, a line interface 18, a memory 19 and a character generator 20, all controlled by a controller 16. The telephone set is operable for calling by any person without setting the portable identification device 4 in the card reader 5, but in this case the calling person cannot be identified.

Figure 5A:
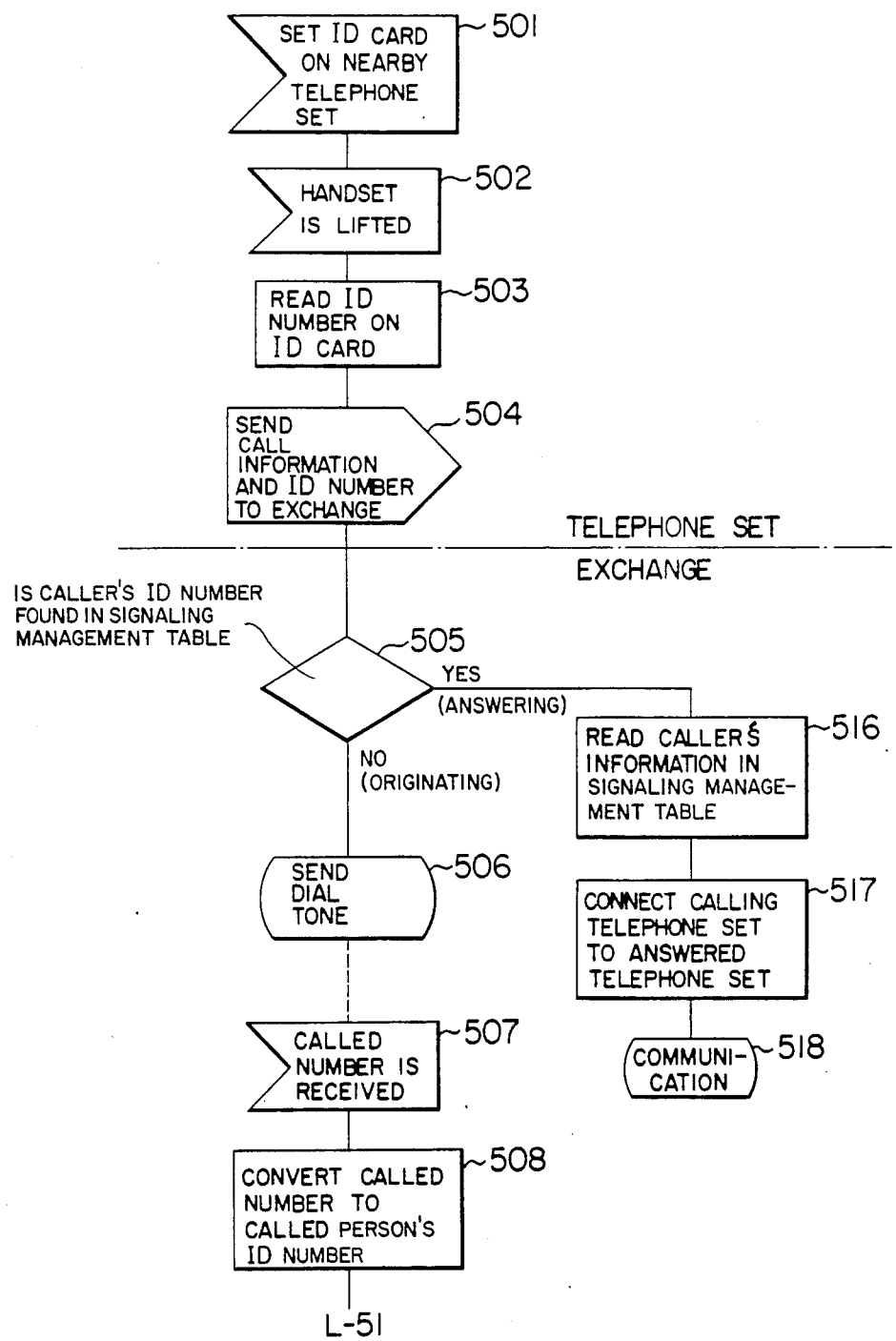
FIGS. 5A and 5B are flowcharts showing the personal-signaling and answering operations in the inventive personal-signaling communication system.
Figure 5B:
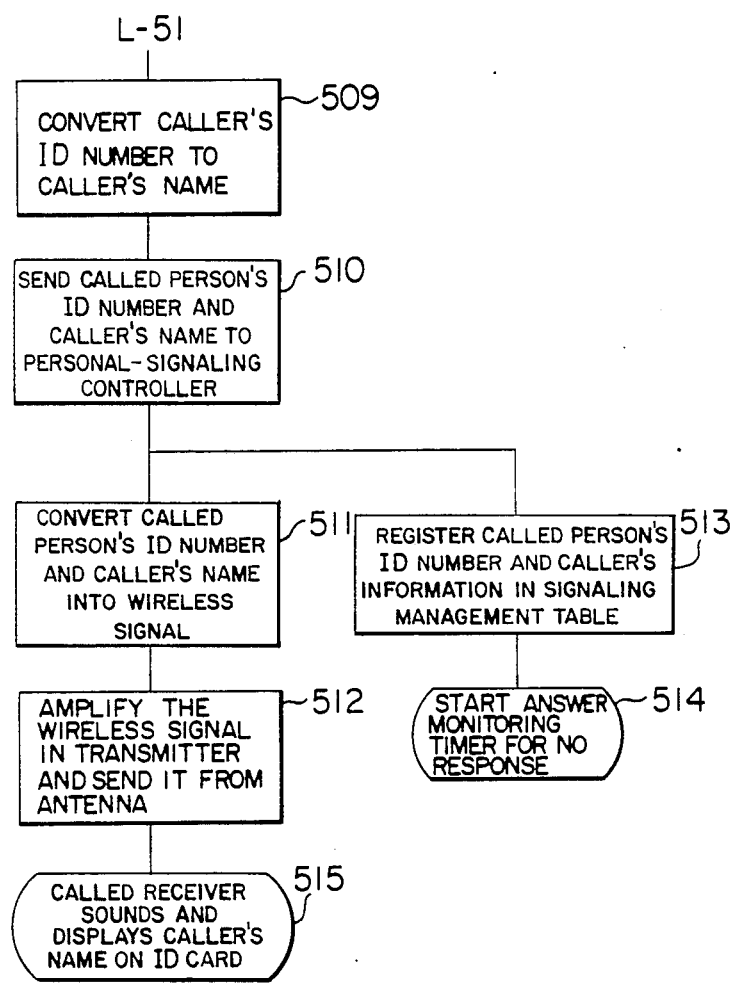

The following describes with reference to the flowcharts of FIGS. 5A and 5B the normal operation with the portable identification device 4 set in the card reader 5. The calling person inserts one's portable identification device 4 into the card reader 5 of a nearby telephone set 1 which is generally one's own telephone set (FIG. 5A, step 501). Subsequently, when the handset 2 is lifted (FIG. 5A, step 502), it is sensed by the controller 16 in FIG. 3, which then activates the card reader 5 through the input/output interface 17 to read the caller's ID number recorded on the magnetic stripe 12 shown in FIG. 2 (FIG. 5A, step 503). The controller 16 transmits the off-hook information and caller's ID number as call information in serial format through the line interface 18 to the exchange (FIG. 5A, step 504).

Figure 4:
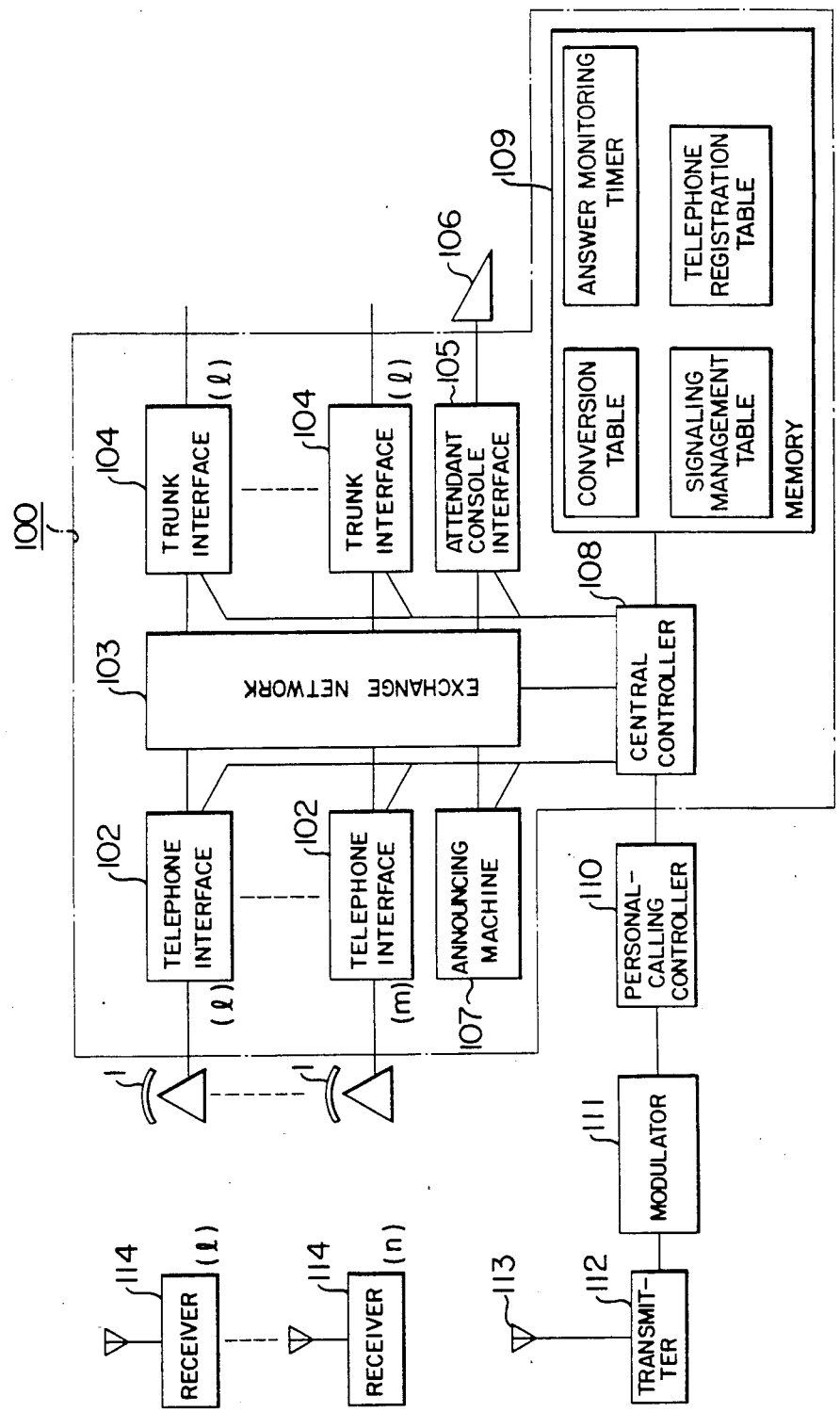
FIG. 4 is a systematic diagram used to explain the present invention.

FIG. 4 shows the overall telephone system explaining the present invention. In the figure, a central controller 108 in an exchange 100 receives call information through a telephone set interface 102 and memorizes the ID number as caller's information. The central controller 108 checks the ID number as to whether it is recorded in the signaling management table in a memory 109 in order to distinguish the call to be an originating call or an answering call (FIG. 5A, step 505). If the ID number is not found in the table, i.e., it is determined to be an originating call, the central controller 108 transmits the dial tone generated by a circuit (not shown) through an exchange network 103 (FIG. 5A, step 506).

On hearing the dial tone, the calling person dials the telephone number of a person to be called through the push-button dial 3 shown in FIG. 3. The dial signals are conducted through the input/output interface 17 to the controller 16, and transmitted through the line interface 18 to the exchange 100. The dial information sent to the exchange 100 is received by the central controller 108 via the telephone line interface 102 in FIG. 4 (FIG. 5A, step 507). The central controller 108 refers the telephone number to an ID conversion table in the memory 109, so that the telephone number of the called person, generally in 3-4 digits, is converted into the ID number of the called person, for example, as a personal signalling code of 6-8 digits (FIG. 5A, step 508). The central controller 108 further refers to another conversion table in the memory 109 so that the caller's ID number is converted into the name of the calling person (FIG. 5B, step 509).

The central controller 108 transfers the called person's ID number and calling person's name to a personal-signaling controller 110 provided in a wireless pager device 115 (FIG. 5B step 510), and registers the called person's ID number and the caller's information such as the address of the calling telephone line in the exchange and the caller's ID number in the signaling management table in the memory 109 (FIG. 5B, step 513). At this time, an answer monitoring timer in the memory 109 for detecting no response starts operating (FIG. 5B, step 514).

In FIG. 4, when the personal-signaling controller 110 receives the called person's ID number and calling person's name, it activates a modulator 111 so that the information is transformed into a wireless signal (FIG. 5B, step 511). The wireless signal is not confined to the electromagnetic wave, but includes signal transmission forms utilizing the light wave and the ultrasonic wave. Also, there are several modulation systems applicable such as a serial digital code transmission in the time domain and spread spectrum transmission in the wide spread frequency domain. However, it is the general convention to use the electromagnetic wave and modulate the signal directly into a time serial binary signal on the basis of the frequency shift keying (FSK) technique. In the wireless pager device, the modulated signal is amplified by a transmitter 112 and transmitted through an antenna 113 (FIG. 5B, step 512).

The transmitted radio wave is received by all receivers 114 shown in FIG. 4 located within a reach of the radio wave. The receiver 114 is built in the card-type portable device 4 having the appearance as shown in FIG. 2, and the device incorporates the caller's name display panel 8 and magnetic stripe 12 in addition to its basic functions similar to the pocket bell, as described previously.

On receiving the radio wave, the receiver 114 performs correlation as to whether the called ID number is its own ID number. If both numbers do not coincide, the received information is ignored. If both numbers are consistent, the receiver 114 receives the calling person's name, which is sent subsequently to the called ID number, and converts it into character patterns, e.g., SMITH, so that it is displayed on the display panel 8, while activating the piezo-electric element to emit an audible signal altering call arrival (FIG. 5B, step 515).

The holder of the receiver 114 notices the incoming call by hearing the audible signal, and knows the name of the calling person on the display panel on the device. The audible signal is stopped by pressing the key 9 on the receiver, and the display is erased by pressing the key 10.

For the answer to the incoming call, the called person goes to a nearby telephone set and inserts the portable identification device 4 in the card reader 5 (FIG. 5A, step 501). These operations conducted by the called person and the system are identical to the case of originating call described previously (FIG. 5A, steps 501–504).

In the answering procedure, the ID number of the responding person has already been registered as a signaled ID number in the signaling management table in the memory 109 in FIG. 4 (FIG. 5B, step 513) when the central controller 108 in FIG. 4 has determined whether or not the call is an originating call in step 505 of FIG. 5A, resulting in the negation of originating call. The central controller 108 reads the caller's information, i.e., the telephone line address and ID number, in the signaling management table (FIG. 5A, step 516), erases them from the table and connects the calling telephone set with the answered telephone set (FIG. 5A, step 517). At this time, it is also possible to display again the calling person's name, e.g., SMITH, on the called telephone set. Thus, communication is established between the calling person and the desired called person.

When a person is present at the telephone with one's portable identification device 4 inserted into the card reader 5 of the telephone set 1, the receiver set on the telephone set will sound to indicate an incoming call, and it can be answered in the same manner as that of the conventional telephone set.

The following describes briefly the process for the case when the called person is absent from the service area or when the person does not respond to an incoming call purposely in view of the caller's name. Even if the person-to-person call becomes dominant, a message left for the absent called person is requested. A communication system with a mail service function can solve this matter without human intervention, but such system is not prevalent.

An embodiment of the process for coping with the missing response will be described using the flowchart of FIG. 6. In step 514 in FIG. 5B, an answer monitoring timer in memory 109 starts counting in response to the beginning of signaling. When a predetermined duration, e.g., 30 seconds, has elapsed (FIG. 6, step 601), the timer indicates a time-out to the central controller 108. The central controller 108 reads the caller's information in the signaling management table with reference to the called person's ID number (FIG. 6, step 602), and erases information related to the called person in the table.

Figure 6:
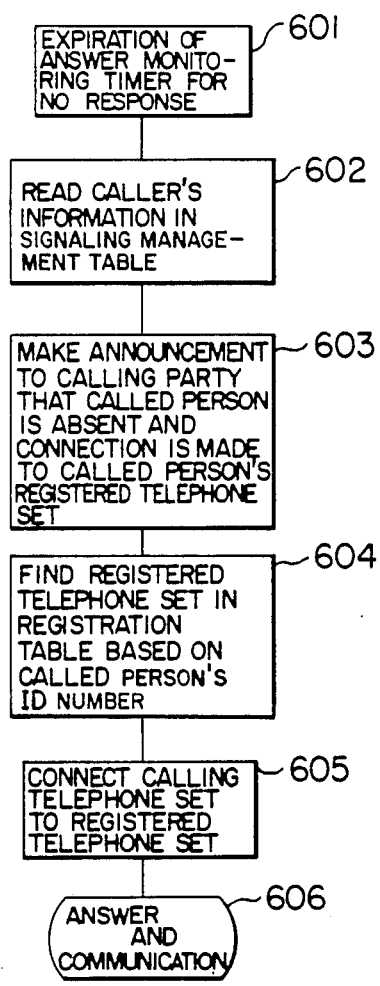
FIG. 6 is a flowchart showing an example of operation dealing with the call not answered in the inventive personal-signaling communication system.

The central controller 108 connects an announcing machine 107 to the calling telephone set to give a message such as "We have no response from the called party, and you will be connected to the registered telephone set." (FIG. 6, step 603). The registered telephone set is that of the secretary of the called person or a neighborhood person who is to be requested to leave a message or to tell of the whereabouts of the called person. The memory 109 includes a telephone registration table indicating the correspondence between ID numbers and registered telephone sets to be connected in the case of time-out (no answer), and the central controller 108 knows the registered telephone set by referring to the table with the ID number of the called person (FIG. 6, step 604).

The central controller 108 connects the calling telephone set to the registered telephone set (FIG. 6, step 605), and the calling person can ask a person at the registered telephone set to take a message or indicate the whereabouts of the called person.

In this system, both of the telephone set 1 and portable identification device 4 have a display panel 8, and when the same person is called successively, it is possible to have an alert at each call that is followed by the answer on a first-come-first-served basis and inform the calling person that there has been a preceding call and inform the called party that there have been a plurality of incoming calls. Alternatively, it is possible to allow the called party to choose a calling party to be answered instead of the first-come-first-served rule. In this case the receiver needs to receive the all calling ID number, and the card reader 5 needs to read the state of a memory or a key operation for specifying the priority of answering.

Although in the foregoing embodiment the case of the internal call within the same private branch exchange has been described, similar personal signaling is possible for an incoming call, for example, via the trunk through the procedure such that an incoming call through the trunk interface 104 in FIG. 4 is answered by the operator at an attendant console 106 and after the connection between the trunk line and the console has been established through an attendant console interface 105 the operator calls the called party while holding the trunk. The latter case merely differs from the former case in that the operator is assumed to be the calling party during the operator intervention operation, and the incoming trunk interface 104 is assumed to be the calling line after the operator has proceeded to the operation of another call.

As described above, the present invention contemplates to convert the conventional telephone-to-telephone, i.e., station-to-station, system into a person-to-person system, allowing a more person-oriented communication system in an automatic fashion.

Further as advance are made in office automation, the need for person-to-person communication becomes more important. Such an unprofitable task as responding to a call for another person will be more noticed as the rationalization of the whole business goes deeper. The present invention enables without human intervention any person-to-person call, person-to-station call, and station-to-station call, and is highly contributive to the coming office automation.

Moreover, the provision of a display panel on the portable identification device for displaying the caller's name allows the called person to determine whether or not a response should be taken for that call.

We claim:

1. A personal-signaling communication system comprising:
   a portable memory device provided with memory means for storing personal identification information and a portable receiver device provided with receiver means operable in response to receipt of a wireless personal signaling code to provide an indication of received signaling;
   a plurality of communication terminal units connected by way of respective lines to an exchange facility and each provided with a reader to read personal identification information stored in said portable memory device and each of which includes means for transferring said personal identification information, a called number signal and an off-hook signal to said exchange facility;
   a wireless pager device connected to receive a personal signaling code from said exchange facility for transmitting said personal signaling code by wireless communication to said portable receiver device; and
   said exchange facility including means for converting a called number signal, received from a communication terminal unit along with a caller's personal identification information, to a personal signaling code, memory means for storing a personal signaling code in correspondence with said received caller's personal identification information to form a signal management table, comparison means responsive to reception of personal identification information and an off-hook signal from a communication terminal unit for comparing the received personal identification information with data forming said signaling management table as stored in said memory means, first means responsive to said comparison means not detecting the received personal identification information in said signaling management table for transferring a personal signaling code from said converting means to said wireless pager device and for storing said received personal identification information along with said caller's personal identification information in said signaling management table in said memory means, and second means responsive to said comparison means detecting the received personal identification information in said signaling management table for effecting connection selectively between the communication terminal unit from which the personal identification information is received and a line to another communication terminal unit identified by caller's personal identification information derived from said signaling management table in said memory means.

2. A personal-signaling communication system according to claim 1, wherein said portable receiver device is provided with display means for displaying information related to a call, such as a calling person's name, which is sent as part of said personal signaling code from said wireless pager device.

3. A personal-signaling communication system according to claim 1, wherein said exchange facility includes timer means for determining if a call from a calling communication terminal unit is not answered by a called communication terminal unit for at least a predetermined length of time, means for storing the identification of a selected communication terminal unit to be connected to a calling communication terminal unit in case a call is not answered by the called communication terminal unit, and means for terminating a call to said selected communication terminal unit whose identification has been stored in advance in correspondence to personal identification information of said called party.

4. A personal-signaling communication system according to claim 2, wherein said portable receiver device includes means for emitting an acoustic call signal to a called party in response to receipt of a wireless personal signaling code.

* * * * *

UNITED STATES PATENT AND TRADEMARK OFFICE
CERTIFICATE OF CORRECTION

PATENT NO. : 4,680,785
DATED : July 14, 1987
INVENTOR(S) : T. AKIYAMA et al

It is certified that error appears in the above—identified patent and that said Letters Patent is hereby corrected as shown below:

Title page, insert item [30] to read as follows:

-- Foreign Application Priority Data

November 11, 1983   Japan   210932/83 --.

Signed and Sealed this

Third Day of May, 1988

Attest:

DONALD J. QUIGG

Attesting Officer

Commissioner of Patents and Trademarks